United States Patent

[11] 3,634,176

[72] Inventors Peter H. Covert
Pomona;
Jack J. Gilbert, Suffern, both of N.Y.
[21] Appl. No. 638,995
[22] Filed May 16, 1967
[45] Patented Jan. 11, 1972
[73] Assignee Arcata Microfilm Corporation
Menlo Park, Calif.
The portion of the term of the patent subsequent to Oct. 17, 1984, has been disclaimed.

[54] APPARATUS FOR MAKING MICROFICHE
8 Claims, 5 Drawing Figs.

[52] U.S. Cl. .................................................. 156/580,
156/584, 242/673
[51] Int. Cl. .................................................... B32b 31/16,
B65h 17/18

[50] Field of Search ................................................... 156/584,
344, 512, 562, 440, 442; 242/55.3, 67.3, 68.5,
55.53

[56] References Cited
UNITED STATES PATENTS

| | | | |
|---|---|---|---|
| 2,363,442 | 11/1944 | Scott ........................ | 156/584 X |
| 3,347,734 | 10/1967 | Covert et al. ............. | 156/584 X |
| 3,077,919 | 2/1963 | Krueger ..................... | 156/584 |
| 3,169,895 | 2/1965 | Sohn ......................... | 156/584 UX |

*Primary Examiner*—Benjamin A. Borchelt
*Assistant Examiner*—J. J. Devitt
*Attorney*—Davis, Hoxie, Faithfull & Hapgood

ABSTRACT: A machine for paying out indefinite length of microfilm having adhesive applied to its edge and for stripping protective tape from the adhesive.

Inventors
Peter H. Covert
Jack J. Gilbert
By Davis, Hoxie, Faithfull & Hapgood
Attorneys

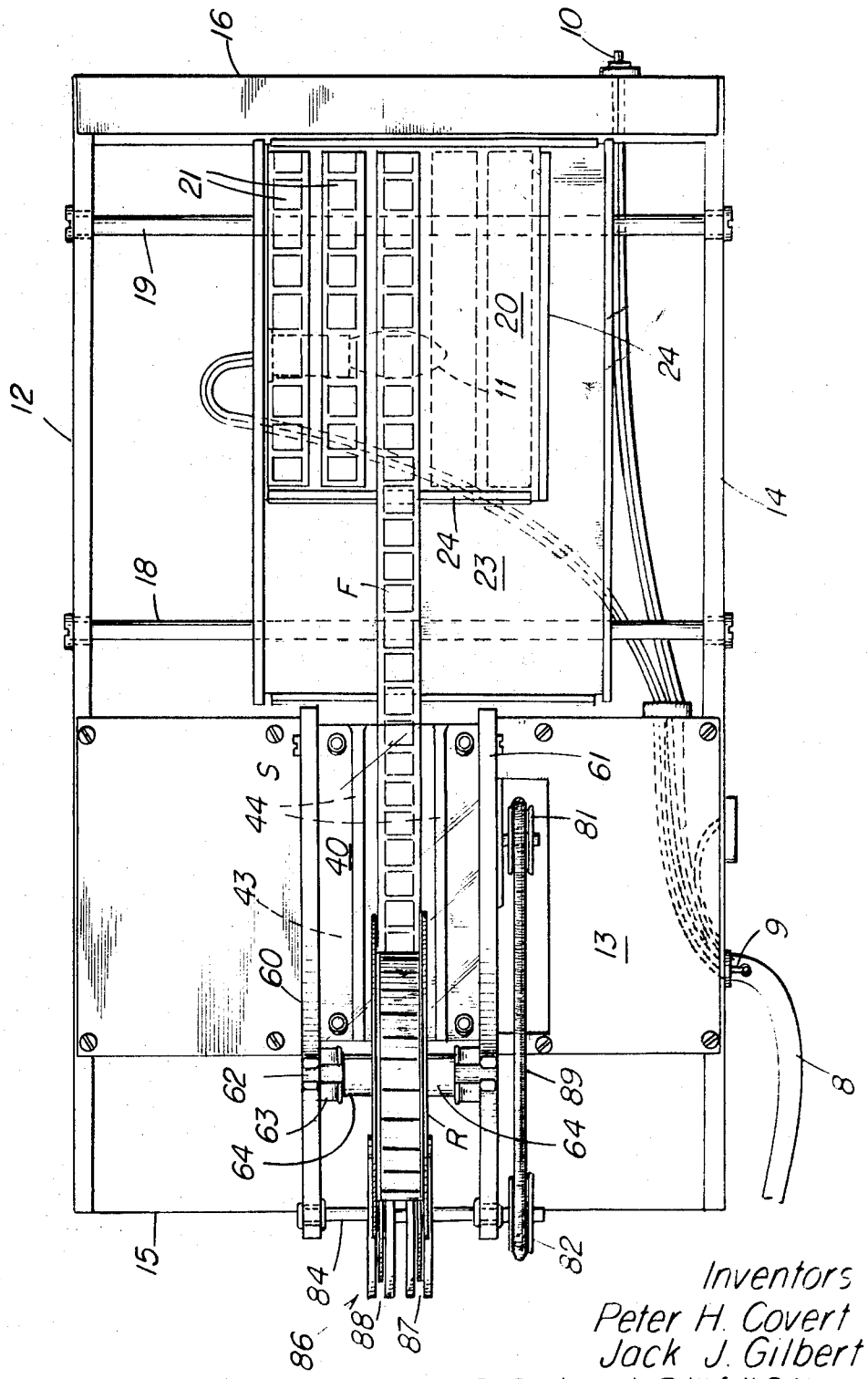

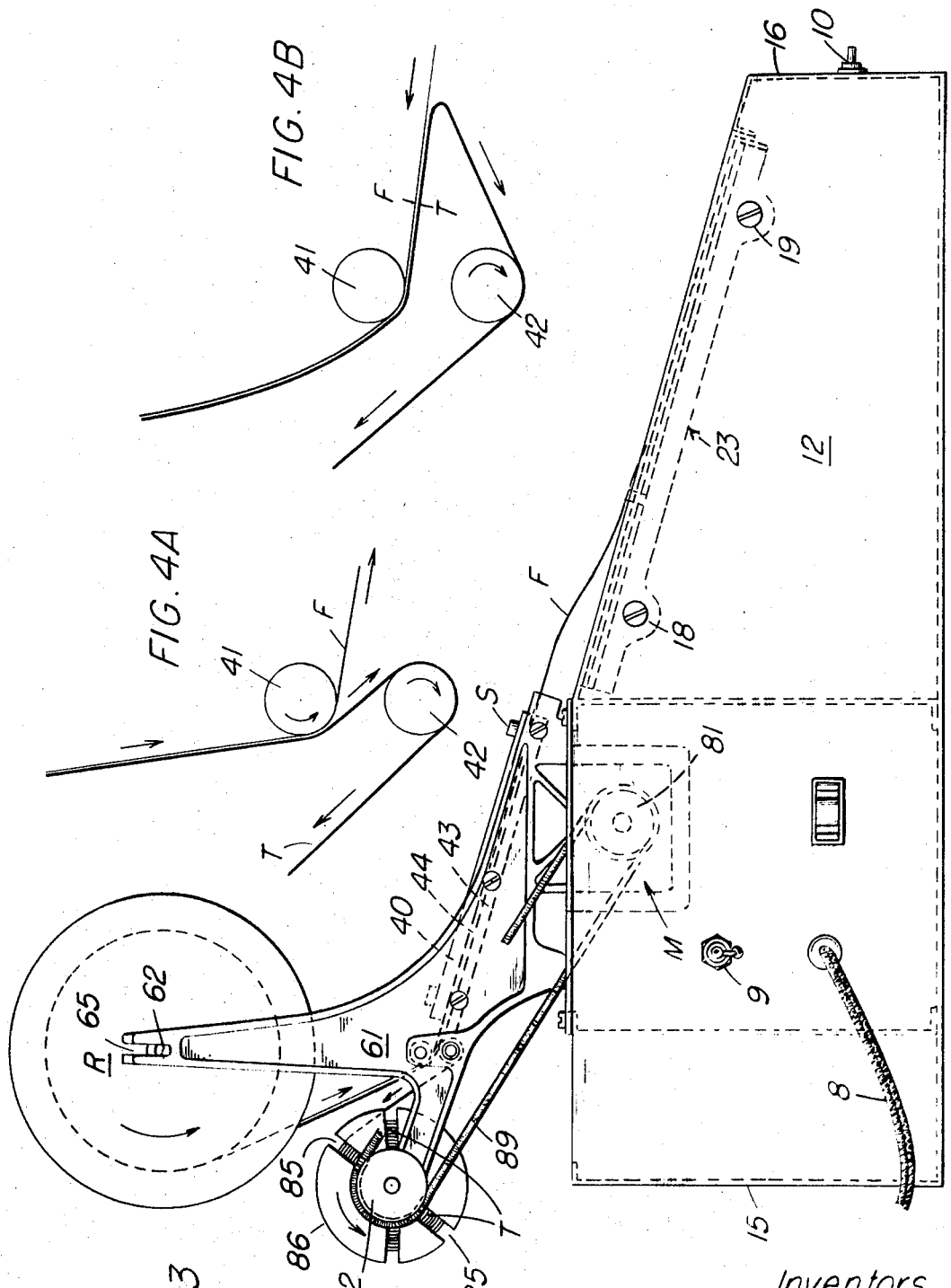

APPARATUS FOR MAKING MICROFICHE

This invention relates to the preparation of microfiche by the adherence of strips of microfilm to a transparent plate, card or sheet.

In our copending application filed Mar. 2, 1964, Ser. No. 348,427, we have disclosed and claimed Microfiche and Methods and Apparatus for Making the Same wherein microfilm is prepared for adherence to a prepared card, plate or sheet, commonly 3×5 inches, but also of various other sizes. According to our process, there is adhered to opposite edges of one surface of the film two narrow parallel strips of a plastic tape which has a pressure-sensitive adhesive coating on both sides. Those surfaces of the strips which are not adhered to the film are covered with a strippable protective ply of an uncoated plastic tape. The uncoated protective tape preserves the adhesive qualities of the pressure-sensitive tape and prevents adhesion until desired.

In our copending application filed Mar. 13, 1964, Ser. No. 351,714, we have disclosed and claimed APPARATUS FOR MAKING MICROFICHE. That apparatus pays out indefinite lengths of microfilm which is provided with pressure-sensitive adhesive strips located on opposite edges, and positions such lengths for assembly on a transparent card. The present invention is for an improved apparatus for accomplishing these purposes.

The present invention relates to and has for an object the provision of apparatus for facilitating the application and adherence of the prepared film to the transparent sheet or card in a series of strips side by side across the sheet.

Another object is to make provision in such apparatus by paying out lengths of film such that a length may be cut at the end of a filmed subject.

Another object is to provide a machine for applying lengths of film to differing sizes of cards or sheets.

Another object is to provide apparatus for removal of the protective covering tapes from the adhesive strips as the film is payed off its reel.

Another object is to provide simple reliable, and inexpensive apparatus for protective tape removal and payout of indefinite length of microfilm having pressure-sensitive adhesive on its edge.

Other objects and advantages will become apparent as the invention is described in connection with the accompanying drawings.

In the drawings:

FIG. 2 is a plan view of the apparatus.

FIG. 3 is a view in elevation of the apparatus.

FIGS. 4A and 4B are schematic diagrams of the tape removal and payout functions of the apparatus.

Figure 1:
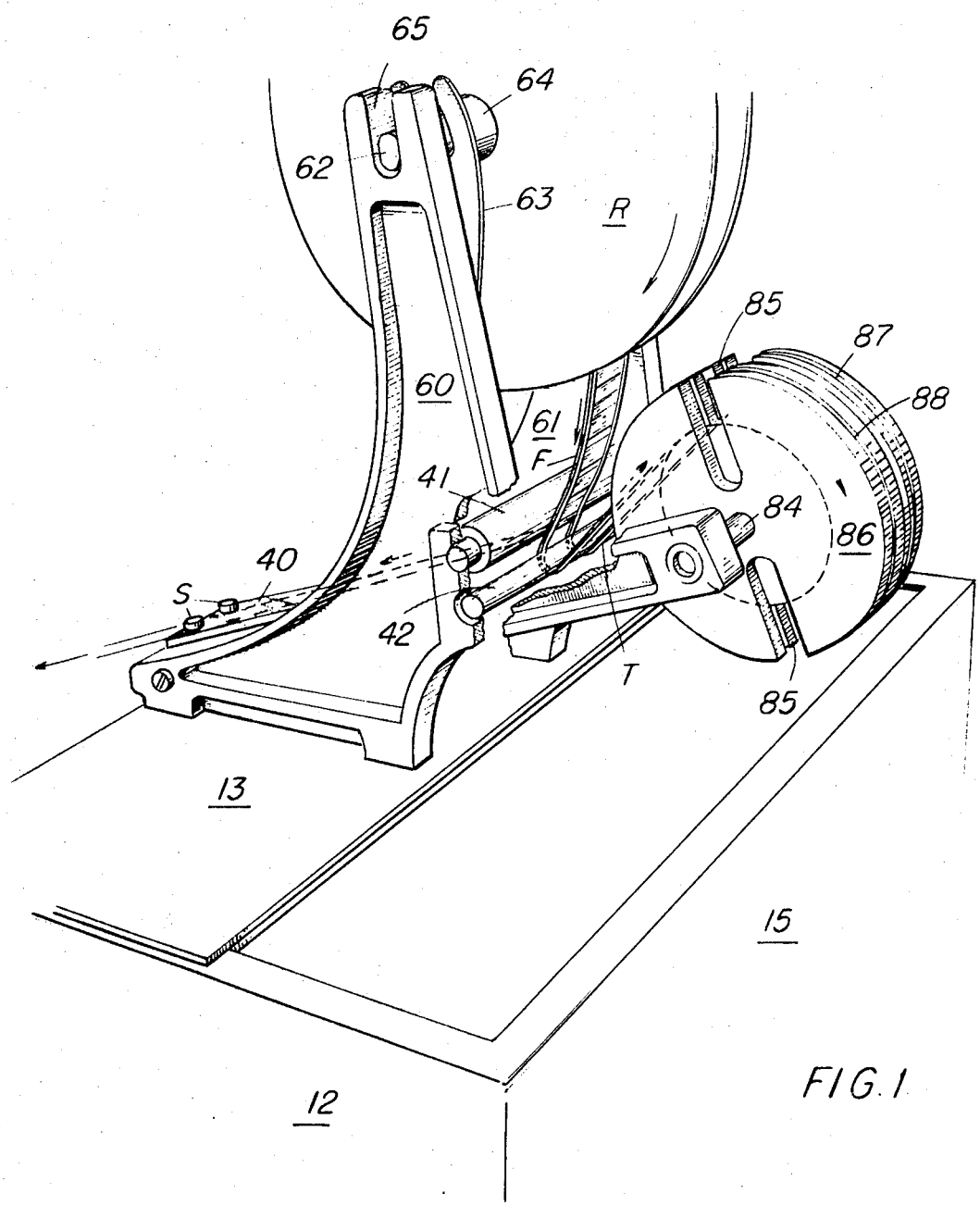
FIG. 1 is a perspective view of a portion of apparatus embodying the invention.

Referring to the drawings, the mechanism is supported by a chassis or frame composed of a pair of similar vertical plates 12 and 14 which are held parallel to each other by end plates 15 and 16 and a horizontal deck 13. Transverse guide rods 18 and 19 also connect the sideplates and serve additionally to guide lateral sliding movement of a plate transport, as hereinafter more fully described.

Strips of microfilm 21, cut to suitable length and provided with pressure-sensitive adhesive edge strips, are to be mounted on a transparent plate, sheet, or card 20. Such cards are customarily cut from a larger sheet of cellulose acetate film of suitable thickness, but any transparent sheet, plate, or card may be used.

To support and transport the film-mount plate, a laterally movable platen 23 of transparent or translucent material is supported by, and between, two parallel bars or guide rods 18 and 19. Suitable sliding bearings (not visible) are provided on the underside of platen 23 to permit free sliding motion of the platen 23 on guide rods 18 and 19. The platen 23 may be provided with conventional spring detent means to assist in moving the platen in even increments according to the width of the microfilm strips. To locate and hold the mounting plate 20 on the platen 23, stop strips 24 are provided. Such strips may be affixed permanently to the platen where but one size of mounting plate is employed, or may be adjustably positioned on the platen 23 to accommodate a variety of mounting card sizes. A small lamp 11 may be positioned under the transparent or platen 23 to aid in observing the images on the film and to aid in properly positioning the cut strips of microfilm 21 in side-by-side relationship.

Microfilm to be mounted is provided with pressure-sensitive adhesive strips on its edges. These adhesive strips are protected from soiling and precluded from unintentional adhesion by covering the adhesive strips with tapes of protective film in accordance with the teachings of our above-mentioned copending application, Ser. No. 348,427. Such prepared microfilm is stored on reels until ready for mounting on plates.

To feed film into position overlying the film-mounting card and ready to have the attendant cut off the proper length, a film carrier and dispenser is mounted on the horizontal deck 13 which is supported by the sideplates 12 and 14 of the chassis.

The film carrier and dispenser supports a reel R of prepared microfilm F. The film carrier comprises a pair of parallel, generally vertical arm members 60 and 61. These arms are rigidly supported by deck 13. The upper extremities of the arms are provided with aligned horizontal slots 65 which receive a removable reel support shaft 62. The shaft 62 is provided with flattened ends which engage the slots 65 to prevent rotation of shaft 62. Shaft 62 passes through the hub of a microfilm reel R. Spacer members 64 are removable from shaft 62 and are for the purpose of accommodating microfilm reels of differing thickness or width. Microfilm is commonly made in 16 mm. and 35 mm. widths. Spacers 64 account for the difference between these widths. Flat springs 63 serve to center the reel R and act as a brake to prevent unwanted turning of the reel R.

The carrier arms 60 and 61 also support a protective tape takeup reel 86. The takeup reel 86 is provided with dual sheaves or circumferential grooves 87 and 88 to receive the pair of protective tapes T which are stripped from the prepared microfilm. Grooves 87 and 88 are spaced apart by a distance equal to the distance between the tape covered pressure-sensitive strips on the microfilm and are in alignment with those strips. Takeup reel 86 is positioned on the carrier arms 60 and 61 by a cross-shaft 84 which is supported in suitable bearings by the carrier arms. Transverse slots 85 are proved in the takeup reel 86 to facilitate threading the tapes T during operation of the apparatus. The function of slots 85 will be more fully described in the description of the operation of the apparatus. The exterior end of cross-shaft 84 carries a pulley 82 which is driven by means of a spring belt 89 or the like. The belt 89 is driven by a similar pulley 81 on the shaft of a motor M within the chassis shown in dotted outline in FIG. 3.

A film guide means 43 is located between, and supported by, the lower portions of carrier arms 60 and 61. The film guide means 43 is a metal plate having a longitudinally shallow channel of a depth approximating the thickness of microfilm with clearance. A cover plate 40 closes the channel and is removably attached thereto by thumbscrews S. Microfilm F from the reel R is sandwiched in the channel between the cover plate 40 and the guide means 43. The film is free to advance longitudinally through the channel thus formed and is guided in a straight line by the sidewalls of the shallow channel.

To keep the adhesive strips on the edges of the film out of contact with the channel bottom, the channel bottom is relieved by a pair of parallel grooves of somewhat greater depth than the remainder of the channel. That remainder of the channel bottom upon which he film rides is narrower than the distance between the adhesive strips on the film. The adhesive edges thus extend laterally beyond the film supporting portion of the channel and occupy the region over the parallel grooves.

To accommodate more than one width of microfilm, the film guide means 43 may be provided with a relatively wide shallow channel and with removable or adjustable strips 44 which define the side edges of the guide channel. Such strips are positioned apart by a distance equal to the width of the film and are preferably fashioned from a plastic material with a low coefficient of friction. The grooves underlying the region of the adhesive strips may be provided at spacings appropriate for the film widths to be accommodated.

A film guide roll 41 directs film from the reel R to the film guide means 43. The roll 41 is preferably fabricated from a plastic material to reduce scratching of the film surface. A tape guide roll 42 directs the tape T toward the driven takeup reel 86. Both the film guide roll 41 and the tape guide roll 42 are supported in suitable bearings by the carrier arms 60 and 61.

The motor M within the chassis is controlled by a normally off momentary switch 10 on the front of the chassis. Power to the motor is provided through a line cord 8 and is controlled by an off-on switch 9.

The operation of the apparatus will now be described. A transparent card 20 upon which film is to be mounted is provided by the attendant and positioned against stop strips 24 on the platen 23.

The desired reel R of microfilm is selected and the reel support shaft 62 is removed from the machine and inserted in the reel hub. If necessary, spacers 64 are placed on the shaft 62 on either side of the reel R. The reel and shaft assembly are positioned in slots 65 in the tops of carrier arms 60 and 61. The reel is oriented so that the film leaves the reel downwardly and at the rear of the machine. A length of film or of film leader is unwound and threaded between the film guide roll 41 and the tape guide roll 42. In other words, the film F is passed below the film guide roll 41. The protective tapes T adhering to the adhesive strip are removed by hand from the threaded length of film. The removed tapes are threaded around the tape guide roll 42 such that the tapes contact approximately 180° of the roll 42 and exit from the bottom thereof. The ends of the two tapes are tied together and their juncture is dropped into one of the transverse slots 85 near the top of the takeup reel 86. The tapes are threaded into their appropriate takeup reel sheave grooves 87 and 88 in alignment with the tape covered adhesive strips on the film edges.

The length of film from which the tapes have been removed is introduced to, and passed through the film guide means 43. The cover plate 40 may be removed to facilitate the position of the film in the guide means but such removal is not necessary.

The apparatus is now properly threaded with a supply of microfilm. The attendant may now proceed to mount film on the cards. The power switch 9 is turned on and the platen 23 carrying the card 20 is moved to the left in FIG. 2 until the right edge of the card is in alignment with the film F. The operating switch 10 is pressed until a suitable length of microfilm F with the protective tapes removed is payed out over the card 20. Release of the operating switch 10 stops the film. The attendant cuts off the appropriate length of film to form a strip 21 which is pressed down onto the card 20 to become adhered.

The film F is payed out and the protective tapes T stripped therefrom simultaneously. Pressing the operating switch 10 causes the motor M to turn. The motor pulley 81 transmits motion to the takeup reel pulley 82 by means of a belt drive 89. Rotation of the takeup reel 86 in the direction of the arrows in FIGS. 1 and 3 winds the tape T into the appropriate grooves 87 and 88 in the takeup reel. The pull exerted on the tapes T by the takeup reel pulls film from the reel R. The film and the tape are separated from each other and appropriately directed by the film and tape guide rolls 41 and 42. The film F is forced through the film guide means 43 to exit as a moving length of film overlying the film-mounting card 20. FIG. 4A schematically shows the paths of the film and tape.

In the event that film is manually pulled through the machine, slack will occur in the tape takeup system. This condition is shown schematically in FIG. 4B. When the operating switch 10 is again pressed, the takeup reel 86 will revolve and pull the slack tape from the film guide system. In so doing, the film is caused to retreat with the moving tape. The film that was manually pulled through the machine will continue to retreat until the loop of slack in the tape encounters the tape guide roll 42. The film will now advance in the manner shown in FIG. 4A until operating switch 10 is released. The apparatus is thus self-clearing and fouling of the mechanism is prevented.

If the last strip contains less material than would normally constitute a length 21, the film may be cut at a lesser length. Accordingly, the attendant will pay out a shorter length of film to complete the subject of a particular card.

Many modifications within the scope of the invention will occur to those skilled in the art. Therefore, the invention is not limited to the specific embodiment illustrated and described.

What is claimed is:

1. A machine for paying out lengths of microfilm to be applied to transparent sheets, said microfilm having narrow strips of pressure-sensitive adhesive material adhering to and extending only along the edges of said microfilm and protective tapes on said narrow strips, said machine comprising a support on the machine for a reel of microfilm, a takeup reel on the machine to receive and wind up said protective tapes as they are removed from the film leaving said narrow strips exposed, means to guide the microfilm, driving means for causing rotation of said takeup reel to pull said tapes from said film and to simultaneously advance the microfilm from its reel and along the film guide means.

2. A machine as claimed in claim 1 having means to guide said tapes from said microfilm to said takeup reel.

3. A machine as claimed in claim 1 having movable means to support a transparent sheet in position underlying the guided microfilm for application of the film to the transparent sheet.

4. A machine as claimed in claim 1 having power-driven means to cause rotation of said takeup reel, and control means to start and stop over said power-driven means.

5. A machine as claimed in claim 3 wherein the transparent sheet support means is slidable laterally with respect to the lengths of microfilm to position said sheet supporting means at different points under said microfilm.

6. A machine for removing protective tapes from adhesive strips along the edges of one surface of microfilm and for paying out lengths of film with exposed adhesive strips comprising a support for a reel of film, a power-driven takeup reel for receiving and winding up removed protective tapes, and means for guiding the paid out lengths of film.

7. A machine for dispensing microfilm having pressure-sensitive adhesive areas on one surface thereof and for removing protective tapes from the adhesive areas to expose the adhesive, said machine comprising a support for a of microfilm, a controlled power-driven takeup reel for pulling said protective tapes from said microfilm and for winding up the removed protective tapes, thereby causing the microfilm to advance.

8. A machine for mounting lengths of microfilm on transparent cards, said microfilm being reeled on a reel and having been previously provided with pressure-sensitive adhesive strips on the edges of one surface of the film, said adhesive strips being covered by protective tapes, said machine comprising a support for said reel, a power-driven takeup reel for receiving and winding up said protective tapes, control means to start and stop said takeup reel, tape guide means to direct said protective tapes from said microfilm to said takeup reel, said protective tapes on being stripped from said microfilm causing the microfilm to pay off its reel and to advance, guide means for the advancing microfilm, support means for a transparent card, said transparent card support means being movable laterally with respect to the microfilm guide means whereby advanced lengths of microfilm having exposed adhesive strips may be positioned to overlie transparent cards for mounting thereon.

* * * * *